(12) United States Patent
Teulou et al.

(10) Patent No.: US 8,814,079 B2
(45) Date of Patent: Aug. 26, 2014

(54) PYLON FOR ATTACHING AN AIRCRAFT TURBINE ENGINE COMPRISING ALIGNED FRONT WING TIES

(75) Inventors: Olivier Teulou, Toulouse (FR); Lionel Diochon, Toulouse (FR); Isabelle Petrissans Lloveras, Cugnaux (FR)

(73) Assignee: AIRBUS Operations S.A.S., Toulouse (FR)

( * ) Notice: Subject to any disclaimer, the term of this patent is extended or adjusted under 35 U.S.C. 154(b) by 348 days.

(21) Appl. No.: 13/205,995

(22) Filed: Aug. 9, 2011

(65) Prior Publication Data

US 2012/0056033 A1 Mar. 8, 2012

(30) Foreign Application Priority Data

Sep. 3, 2010 (FR) ..................................... 10 57026

(51) Int. Cl.
*B64D 27/00* (2006.01)

(52) U.S. Cl.
USPC .......................................................... 244/54

(58) Field of Classification Search
USPC .................... 244/54; 248/554, 555, 556, 557; 60/796, 797
See application file for complete search history.

(56) References Cited

U.S. PATENT DOCUMENTS

| | | | | |
|---|---|---|---|---|
| 3,831,888 A * | 8/1974 | Baker et al. | ...................... | 244/54 |
| 4,560,122 A * | 12/1985 | Parkinson et al. | ............... | 244/54 |
| 5,806,792 A * | 9/1998 | Brossier et al. | ................. | 244/54 |
| 6,095,456 A * | 8/2000 | Powell | .............................. | 244/54 |
| 7,451,947 B2 * | 11/2008 | Machado et al. | ................ | 244/54 |
| 7,963,479 B2 * | 6/2011 | Cazals | .............................. | 244/54 |
| 7,997,527 B2 * | 8/2011 | Lafont | .............................. | 244/54 |
| 8,205,825 B2 * | 6/2012 | Huggins et al. | .................. | 244/54 |
| 8,353,476 B2 * | 1/2013 | Crook et al. | ..................... | 244/54 |
| 8,474,750 B2 * | 7/2013 | Marche et al. | ................... | 244/54 |
| 2007/0120010 A1 * | 5/2007 | Huggins et al. | .................. | 244/54 |
| 2008/0217467 A1 * | 9/2008 | Lafont | .............................. | 244/54 |
| 2009/0108127 A1 * | 4/2009 | Cazals | .............................. | 244/54 |
| 2009/0212155 A1 * | 8/2009 | Huggins et al. | .................. | 244/54 |
| 2010/0147996 A1 * | 6/2010 | Hartshorn et al. | ............... | 244/54 |
| 2011/0121132 A1 * | 5/2011 | Crook et al. | ..................... | 244/54 |

FOREIGN PATENT DOCUMENTS

| | | |
|---|---|---|
| FR | 2 878 229 A1 | 5/2006 |
| FR | 2 909 973 A1 | 6/2008 |

OTHER PUBLICATIONS

French Preliminary Report issued Apr. 18, 2011, in French Patent Application No. 1057026 with English translation of category of cited documents.

* cited by examiner

*Primary Examiner* — Tien Dinh
*Assistant Examiner* — Michael A Fabula
(74) *Attorney, Agent, or Firm* — Oblon, Spivak, McClelland, Maier & Neustadt, L.L.P.

(57) ABSTRACT

A pylon for attaching a turbine engine of an aircraft having a rigid structure including protruding fittings each having a first orifice and a plurality of ties to attach the pylon onto a wing of the aircraft, the plurality of ties comprising two side front ties to take the thrust forces, the two side front being secured to the first orifices of the protruding fittings to attach the rigid structure firmly to the wing. The plurality of ties further comprises a center front tie positioned between the two side front ties, the center front tie including a ball joint to take forces in a lateral direction of the rigid structure.

7 Claims, 4 Drawing Sheets

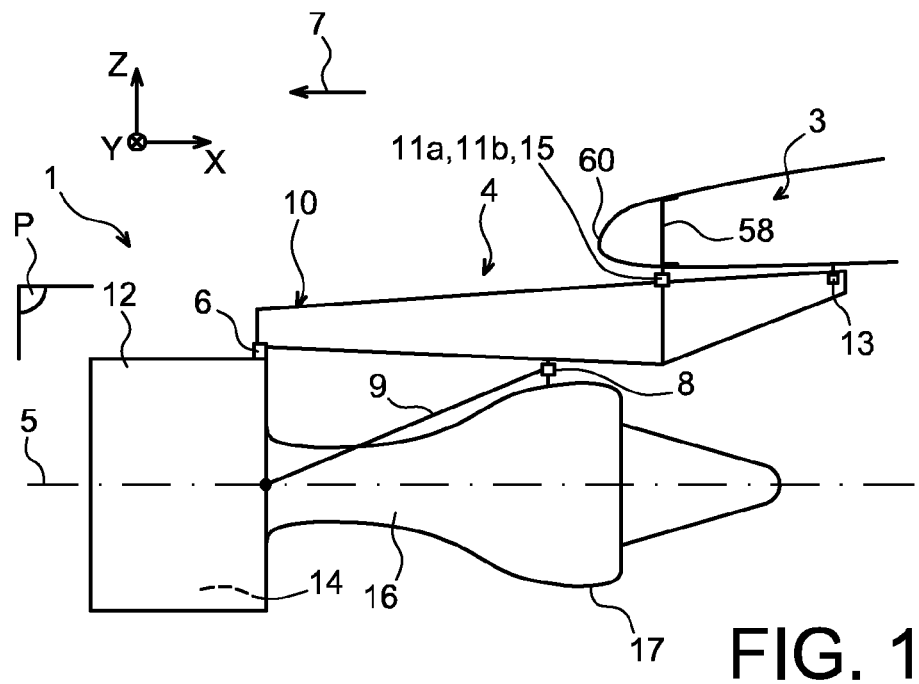

US 8,814,079 B2

PYLON FOR ATTACHING AN AIRCRAFT TURBINE ENGINE COMPRISING ALIGNED FRONT WING TIES

TECHNICAL FIELD

The present invention relates to a pylon for attaching a turbine engine for an aircraft. This type of attachment pylon, also called an "EMS" (Engine Mounting Structure), allows the turbine engine to be hung below the wing of the aircraft, or else allows this turbine engine to be mounted above this same wing.

STATE OF THE PRIOR ART

Such an attachment pylon is actually provided for forming the connecting interface between a turbine engine and a wing of the aircraft. It gives the possibility of transmitting to the structure of this aircraft, forces generated by its associated turbine engine, and also allows the fuel, the electric, hydraulic systems and air to make their way between the engine and the aircraft.

In order to ensure transmission of the forces, the pylon includes a rigid structure, also called a primary structure often of the box type, i.e. formed by the assembly of upper and lower spars connected together via transverse ribs, wherein lateral panels may also be provided.

On the other hand, the pylon is provided with a mounting system interposed between the turbine engine and the rigid structure of the pylon, this system globally including at least two engine ties, generally at least one front tie and at least one rear tie.

Further, the mounting system comprises a device for taking the thrust forces generated by the turbine engine. In the prior art, this device for example assumes the shape of two lateral connecting rods, connected to a rear portion of the fan case of the turbine engine on the one hand, and to a rear tie attached on the central case of the latter on the other hand.

In the same way, the attachment pylon also includes a second mounting system interposed between the rigid structure of this pylon and the wing of the aircraft, this second system, also called means for attaching the pylon on the wing, usually consisting of two or three ties.

Finally, the pylon is provided with a secondary structure ensuring segregation and uphold of the systems while supporting aerodynamic fairings.

As this was mentioned above, a conventional pylon for attaching a turbine engine of the prior art roughly assumes the shape of a parallelepipedal box, having large dimensions in order to be able to take the totality of the forces generated by the associated turbine engine, and transfer them into the wing. In this respect, it is noted that the means for attaching the pylon on the wing comprise a wing rear tie generally designed so as to take at least the forces exerted along the transverse direction of the pylon, so as to be able to participate in taking the moment exerted along the vertical direction, together with another wing tie located further forward on the box, also taking itself the forces exerted along the transverse direction. This method for taking the moment being exerted along the vertical direction in particular then requires that a significant transverse width of the box be provided in the rear portion of the latter, and more generally over the whole length of the pylon.

Therefore, the large size of the pylon, notably resulting from the substantial transverse width of its rear portion, inevitably causes significant perturbations of the secondary flow escaping from the annular fan channel, which is directly expressed by significant drag, as well as losses in terms of turbine engine yield and fuel consumption.

In order to cope with this problem, document FR 2 909 973 provides a pylon having a rigid structure including a front longitudinal central box on the one hand and means for attaching the pylon on a wing of the aircraft on the other hand, these means for attaching the pylon onto the wing comprising two wing side ties each designed so as to take the thrust forces exerted along a longitudinal direction of the pylon, and having a connecting bracket on the pylon attached to the front longitudinal central box, the means for attaching the pylon on the wing further comprising a wing rear tie located rearwards with respect to the side ties. Further, the rigid structure further comprises a rear structure with reduced transverse width relatively to that of the front longitudinal central box, extending the latter rearwards and bearing the wing rear tie designed so as to only take forces exerted along a vertical direction of the pylon.

Thus, in this solution provided by document FR 2 909 973, taking the moment exerted along the vertical direction is achieved by means of two wing side ties each taking thrust forces along the longitudinal direction, and no longer with the wing rear tie. As such, it is noted that the side ties mainly dedicated to taking the thrust forces generated by the turbine engine, are naturally designed so as to withstand the passage of extremely large forces, so that the additional function of taking the moment exerted along the vertical direction of the pylon, by taking the longitudinal thrust forces, does not generate any overdimensioning of these wing side ties, nor that of the longitudinal central box at the latter.

Moreover, the particular method for taking the moment exerted along the vertical direction no longer requires that an overdimensioned width be provided of the portion of the rigid structure located rearwards from the wing lateral ties, given that this rear portion of the rigid structure is no longer dedicated to taking this moment along the vertical direction.

In this solution, it is provided that the means for attaching the pylon onto the wing of the aircraft are formed by the two wing side ties, by the wing rear tie located rearwards with respect to the side ties, and by a wing front tie located forwards relatively to the latter. This front tie is dedicated to taking the forces exerted along the transverse direction Y of the pylon.

Although it meets the problem mentioned above, it is found that this solution may be perfected, notably as regards the mechanical behavior of the vertical brackets integrated to the side ties. These brackets, which cooperate with yokes, actually have the tendency of bending along the transverse direction Y. The generated flexure is not only detrimental in terms of mechanical fatigue, but is also a cause of migration of the rings borne by these brackets, rings which are each intended to receive a joint member between the bracket and its associated yoke in the side tie.

SUMMARY OF THE INVENTION

Therefore the object of the invention is to propose a pylon for attaching an aircraft turbine engine at least partly finding a remedy to the drawbacks mentioned above, relating to the embodiments of the prior art.

To do this, the object of the invention is a pylon for attaching an aircraft turbine engine, said pylon having a rigid structure and means for attaching the pylon on a wing of the aircraft, said means for attaching the pylon onto the wing comprising two side front ties each designed so as to take the thrust forces exerted along a longitudinal direction (X) of the pylon, each side front tie comprising a bracket pierced with a first orifice and intended to be firmly secured to one of the members taken from among the rigid structure and the wing, as well as a yoke intended to be firmly secured to the other one of these members, and a joint member connecting said bracket and yoke by crossing said first orifice, said attachment means further including a central front tie designed so as to take forces exerted along a transverse direction (Y) of the pylon.

According to the invention, said central front tie comprises a ball joint, and is laid out between both side front ties so that the center of the ball joint is located, as seen along the transverse direction (Y), in each of the two first orifices of the side front ties.

This specificity, expressing an alignment of the three front wing ties, allows considerable reduction in the flexure of the brackets of the side ties, which are therefore less strained in fatigue. Further, the phenomenon of migration of the rings, preferentially borne by these brackets, is strongly reduced, or even nonexistent.

These advantages are even more notable when the center of the ball joint is aligned with the center of the first two orifices of the side front ties.

Preferably, said rigid structure includes a box comprising an upper spar, a lower spar as well as two side panels. As seen along the transverse direction (Y) the centers of the first two orifices of the lateral front ties are located in said upper spar or lower spar, depending on whether the turbine engine is intended to be placed above or underneath the wing. This gives the possibility of not introducing any consequent parasitic moment in the box. This advantage is enhanced when the center of the ball joint of the central front tie is itself also located in said upper spar or lower spar.

Preferably, said attachment means also comprise a rear tie including a ball joint, which globally decreases the mass and the bulkiness of such a tie, notably as compared with a solution consisting of an assembly of shackles and fittings.

Preferentially, said means for attaching the pylon onto the wing of the aircraft are formed by said rear tie designed so as to only take the forces exerted along the vertical direction (Z) of the pylon, said two side front ties each designed so as to only take the forces exerted along the longitudinal direction (X) of the pylon and along the vertical direction (Z) of the latter, and said central front tie designed so as to only take the forces exerted along the transverse direction (Y) of the pylon.

With this, it is advantageously possible to form an isostatic system for taking forces between the rigid structure of the pylon and the wing of the aircraft.

The object of the invention is also an engine assembly for an aircraft comprising an attachment pylon such as the one which has just been shown, and an aircraft comprising at least such an engine assembly.

Other advantages and characteristics of the invention will become apparent in the non-limiting detailed description below.

SHORT DESCRIPTION OF THE DRAWINGS

This description will be made with reference to the appended drawings wherein;

FIG. 1 illustrates a schematic side view of an engine assembly for an aircraft, comprising an attachment pylon according to a preferred embodiment of the present invention;

FIG. 2 illustrates a more detailed perspective view of the attachment pylon illustrated in FIG. 1;

DETAILED DESCRIPTION OF PARTICULAR EMBODIMENTS

Figure 3:
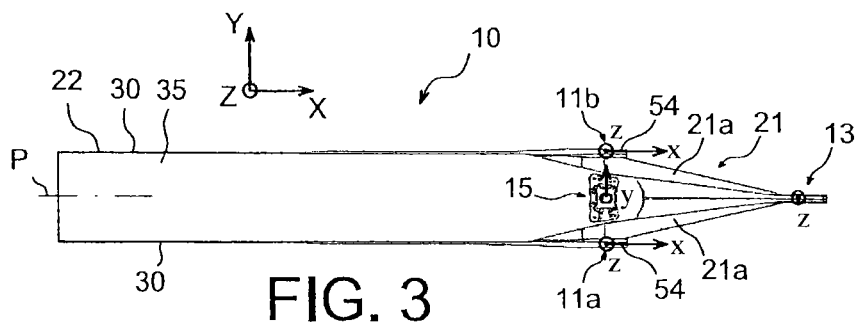
FIG. 3 illustrates a top view of the attachment pylon shown in FIG. 2.
Figure 4:
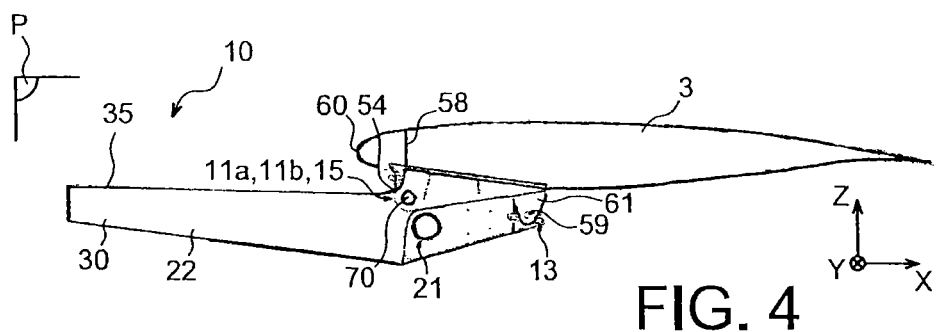
FIG. 4 illustrates a side view of the attachment pylon shown in FIGS. 2 and 3, suspended under a wing of the aircraft via attachment means.
Figure 5:
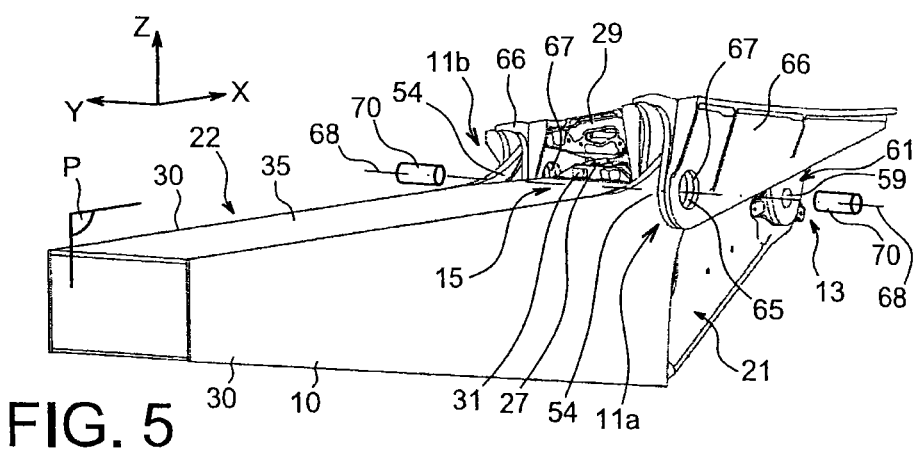
FIG. 5 illustrates a perspective view of the attachment pylon and attachment means shown in FIG. 4.
Figure 5A:
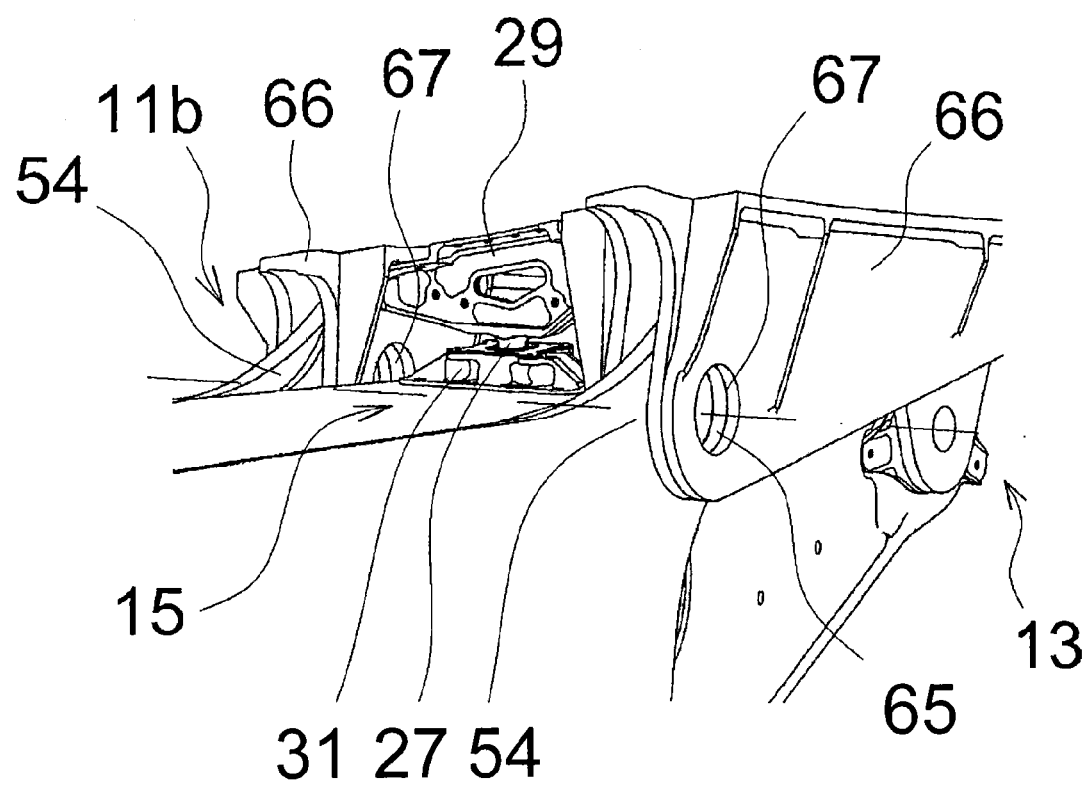
FIG. 5A illustrates a zoomed in view of the perspective view of the attachment pylon and attachment means shown in FIG. 5.

With reference to FIG. 1, it is seen that the engine assembly 1 for an aircraft intended to be attached under a wing/airfoil 3 of this aircraft, this assembly 1 including an attachment pylon 4 according to a preferred embodiment of the present invention.

Globally, the engine assembly 1 consists of a turbine engine 2 and of the attachment pylon 4, the latter being notably provided with a plurality of engine ties 6, 8, 9, with a plurality of wing ties 11a, 11b, 13, 15, and with a rigid structure 10 bearing these ties. As an indication, it is noted that the assembly 1 hung under the wing of the aircraft by means of the plurality of wing ties is moreover intended to be surrounded with a nacelle (not shown).

In all the description which follows, by convention, the longitudinal direction of the pylon 4 which may also be assimilated to the longitudinal direction of the turbine engine 2 is called X, this direction X being parallel to a longitudinal axis 5 of this turbine engine 2. On the other hand, the direction transversely orientated relatively to the pylon 4 and which may also be assimilated to the transverse direction of the turbine engine 2 is called Y, and the vertical direction or of the height is called Z, these three directions X, Y and Z being orthogonal to each other.

On the other hand, the terms of "front" and "rear" are to be considered relatively to a forward movement direction of the aircraft encountered as a result of the thrust exerted by the turbine engine 2, this direction being schematically illustrated by the arrow 7.

In the schematic FIG. 1, it may be seen that only the engine ties 6, 8, 9, the wing ties 11a, 11b, 13, 15 and the rigid structure 10 of the attachment pylon 4 have been illustrated. The other constitutive elements not shown of this pylon 4, such as the secondary structure ensuring segregation and uphold of the systems while supporting aerodynamic fairings, are standard elements identical or similar to those encountered in the prior art, and known to one skilled in the art. Therefore, no detailed description thereof will be made.

On the other hand, the turbine engine 2 has at the front a fan case 12 of large size delimiting an annular fan channel 14, and includes towards the rear a central case 16 of smaller size, containing the core of this turbine engine. Finally the central case 16 extends rearwards with an ejection case 17 of larger size than that of the case 16. The cases 12, 16 and 17 are of course firmly attached to each other. As this emerges from the foregoing, this is preferentially here a turbine engine having a strong dilution rate.

As this may be seen in FIG. 1, a front engine tie 6 is attached onto the fan case 12, at the periphery and at the rear of the latter, the tie 6 being crossed by a vertical plane P defined by the axis 5 and the direction Z.

As this was schematized in FIG. 2, this front tie 6 may conventionally be made by the assembling of connecting rods/shackles and fittings.

Further, a rear engine tie 8 is provided, schematically illustrated in FIG. 1 and in more detail in FIG. 2, this tie 9 also being conventionally made by assembling connecting rods/shackles and fittings, and interposed between the rigid structure 10 and the ejection case 17.

Finally, a device for taking the thrust forces 9 of the standard type with two connecting side rods, symmetrical relatively to the plane P will complete the means for attaching the turbine engine on the pylon. Both connecting rods may be jointed at their front end on a rudder bar mounted on a fitting of the rear engine tie 8.

All these ties form together an isostatic system for load spreading.

With reference to FIGS. 2 and 3, it is seen that the rigid structure 10 is designed so as to have a symmetry relatively to the vertical plane P indicated above, i.e. relatively to the vertical plane parallel to the X direction, defined by the longitudinal axis 5 of the turbine engine 2 and the direction Z.

The front portion of this rigid structure 10 includes a longitudinal box 22, also called a torsion box, which substantially extends in the direction X from the front end of the rigid structure 10, parallel to the same direction. As shown in this figure and as this will be described hereafter, the longitudinal box 22 extends rearwards until is extended with a rear structure with reduced transverse width 21, also belonging to the rigid/primary structure 10 of the pylon 4.

As an indication, the box 22 may be formed by the assembly of two spars/side panels 30 extending along the X direction in parallel XZ planes, and connected with each other via transverse ribs 23 which as for them are orientated in parallel YZ planes. Further, an upper spar 35 and a lower spar 36 are also provided for closing the box 22, each of these spars may be made in one piece or by assembling several elements, and preferentially being of a planar shape.

The foremost transverse rib 23 which closes the box 22, bears the front engine tie 6.

As mentioned above, the rigid structure 10 includes, collected at the rear of the box 22, a rear structure with reduced transverse width 21. It assumes here the shape of a substantially pyramidal structure, having a section which decreases towards the rear. Alternatively, this rear structure 21 may be of constant thickness, for example of the type of those described and illustrated in document FR 2 909 973.

In order to achieve the pyramidal shape, the rear structure 21 is made from two parts symmetrical relatively to the plane P, referenced as 21a, 21a. Both of these paths, each having the shape of a half pyramid, have a base connected to the rear of the box 22, a rear transverse rib being preferentially laid out between both of these entities. This rear transverse rib may be added onto the box 22, or be an integral part of the parts 21a, 21a making up the rear structure 21 having the shape of a hollow pyramid 21.

In FIGS. 3 to 6, the wing ties 11a, 11b, 13, 15 are illustrated in detail, forming together an isostatic load spreading system.

In these figures, it is actually possible to see that the means for attachment to the pylon 4 on the wing 3 of the aircraft are formed by both side front ties 11a, 11b, by the rear tie 13 located at the rear relatively to the lateral ties, and by the central front tie 15 located at the same level as the side ties, along the direction X. The design of these wing ties will now be detailed.

As regards the rear tie 13, it has the particularity of being mounted on the rear structure with reduced width 21, and more specifically on a rear end of the latter. It includes a ball joint 59, the male portion of which is connected to the wing through a yoke 61, and the female portion of which is connected to the box 22 while being housed in an orifice of the rear end of the structure 21. It is designed in order to only ensure the taking of forces exerted along the direction Z, and is connected on the wing 3 rearwards relatively to a front spar 58 of this wing. To do this, the outer ring of the ball joint 59 may be provided so as to slide relatively to its housing in the X direction, and the inner ring of the ball joint 59 may be provided so as to slide relatively to the axis 70 in the direction Y, as this is known to one skilled in the art.

The central front tie 15 is located on a rear portion of the box 22, in proximity to the aforementioned rear transverse rib. It is fixedly added onto the upper spar 35. As this is better visible in FIG. 5, the tie 15 comprises a ball joint 27, the male portion of which is connected to the wing through a connection fitting 29, and the female portion of which is connected to the box 22 through a connection fitting 31 bolted on the upper spar 35. Preferably, the connection fitting 29 is located at right angles or in proximity, in the Z direction, to the wing front spar 58 itself laid out in a known way slightly rearwards relatively to a front end of the leading edge 60. The connection fitting 29 is preferably attached by bolting on this wing front spar 58, along the leading edge 60.

This tie 15, preferably laid out so as to be crossed by the vertical plane P, is only provided for ensuring the taking of the forces exerted along the Y direction. To do this, the outer ring of the ball joint 27 may be provided so as to slide relatively to its housing in the X direction, and the inner ring of the ball joint 27 may be provided so as to slide relatively to the axis of the fitting 29 in the Z direction, as this is known to one skilled in the art.

Both side front ties 11a, 11b are substantially identical and arranged symmetrically relatively to the vertical plane P. They each have a fitting 54 which slightly protrudes rearwards and upwards relatively to the central box 22. Each fitting is preferentially made in one piece with its associated side panel 30, while being located in the same plane as the latter. It is pierced with a first orifice 65 with an axis parallel to the Y direction, intended for the connection of a yoke 66, the two heads of which are located on either side of the fittings 54. Both heads respectively have two second orifices 67, with the same axis 68 as the one of the first orifice 65.

A joint member 70 in the form of an axis, crosses and connects the three orifices 67, 65, 67, this member 70 being also centered on the axis 68, and optionally co-operating with rings (not shown) borne by the orifices.

Both yokes 66 are laid out on either side of the fitting 29 of the tie 15, along the Y direction. They are also themselves located at right angles or in proximity, in the Z direction, to the wing front spar 58, on which they are added fixedly, preferably by bolting.

Both side ties 11a, 11b are each designed so as to only ensure the taking of forces exerted along the X direction, i.e. the thrust forces, and the forces exerted along the direction Z.

Thus, the taking of the moment along the direction X is achieved by two side ties 11a, 11b taking the vertical forces, the taking of the moment along the direction Z is also achieved by means of both side ties 11a, 11b taking the longitudinal forces, while the taking of the moment along the direction Y is achieved by the rear tie 15 on the one hand and by both side ties 11a, 11b each taking the vertical forces.

Figure 6:
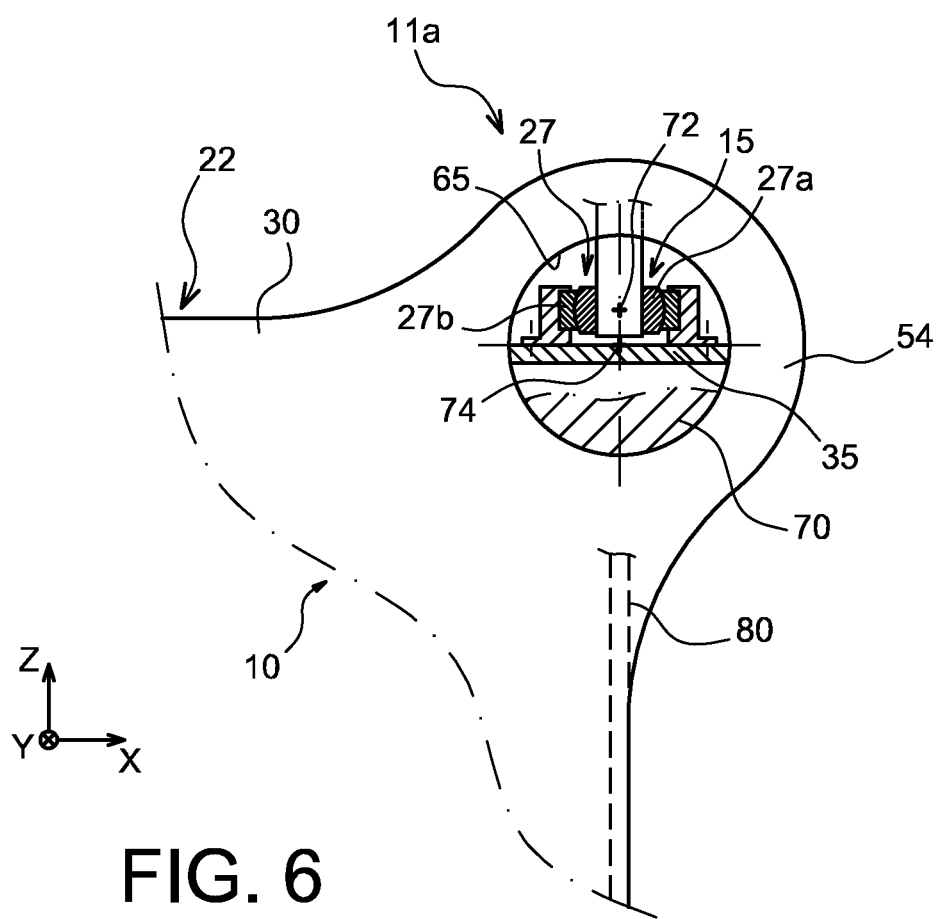
FIG. 6 illustrates an enlarged partial side view of a portion of the means for attaching the rigid structure of the pylon under the wing.

According to a particularity of the invention, in a side view corresponding to a view along the direction Y such as the one shown in FIG. 6 the center 72 of the ball joint 27 of the central tie 15 is located in each of the two first orifices 65 of the side front ties 11a, 11b (only one of the two orifices 65 being visible in FIG. 6, because of their superposition in a side view). Globally this allows alignment of the three front wing ties 11a, 11b, 15, along the direction Y, and avoids flexure of the fittings 54 of the side ties 11a, 11b.

Even if this has not been illustrated, it is even possible to ensure that the centers 74 of the first two orifices 65 are aligned with the center of the ball joint 27, the male portion 27a and the female portion 27b of which have been illustrated in FIG. 6.

Moreover, still in a side view, the centers 74 of the first two offices 65 are located in the upper spar 35. Here, they are more specifically superposed to the outer surface of the upper spar 35. This may also be the case for the center 72 of the ball joint 27. Consequently, no consequent parasitic moment is introduced into the box 22.

Finally, always with the purpose of ensuring proper transmission of the forces in the rigid structure 10, provision is preferably made for aligning the centers 72, 72, 74 along the Z direction and as seen from the side, with the aforementioned rear transverse rib of the box 22, referenced as 80 and schematically shown in FIG. 6.

As an indicative example, the totality of the constitutive elements of the rigid structure 10, which has just been described is made with metal materials, such as steel, aluminium, titanium, or further with composite materials, preferably carbon.

Of course, various changes may be made by one skilled in the art to the pylon 4 for attaching a turbine engine 2 of an aircraft, which has just been described, only as non-limiting examples. In this respect it may notably be indicated that if the pylon 4 has been shown in a suitable configuration so that it is suspended under the wing 3 of the aircraft, this pylon 4 may also appear in a different configuration allowing it to be mounted above this same wing.

The invention claimed is:

1. An attachment pylon to attach a turbine engine to a wing of an aircraft, comprising:
    a rigid structure including a first protruding fitting and a second protruding fitting, each of the first protruding fitting and the second protruding fitting having a first orifice;
    an attaching member to attach the pylon onto the wing, the attaching member including a first side front tie and a second side front tie, each of the first side front tie and the second side front tie being configured to take thrust forces exerted along a longitudinal axis of the pylon, the first side front tie being secured to the first orifice of the first protruding fitting, and the second side front tie being secured to the second protruding fitting; and
    a first joint member connecting the first protruding fitting and the first side front tie by crossing the orifice of the first protruding fitting, and a second joint member connecting the second protruding fitting and the second side front tie by crossing the orifice of the second protruding fitting,
    wherein the attaching member further includes a central front tie configured to take forces exerted along a transverse axis of the pylon, the central front tie including a ball joint laid out between the first side front tie and the second side front tie so that a center of the ball joint is aligned with at least a portion of the orifice of the first protruding fitting and at least a portion of the orifice of the second protruding fitting along the transverse axis of the pylon.

2. The attachment pylon according to claim 1, wherein the center of the ball joint is aligned with an opening of the first front tie and an opening of the second front tie along the transverse axis of the pylon.

3. The attachment pylon according to claim 1 or claim 2, wherein the rigid structure includes a box comprising an upper spar, a lower spar, and two side panels, and
    wherein at least a portion of the orifice of the first protruding fitting and at least a portion of the orifice of the second protruding fitting extends above the upper spar or extends below the lower spar.

4. The attachment pylon according to claim 1, wherein the attaching member further includes a rear tie including a ball joint.

5. The attachment pylon according to claim 4, wherein the rear tie of the attaching member is configured to only take forces exerted along a vertical axis of the pylon,
    wherein the first side front tie and the second side front tie are configured to only take forces exerted along the longitudinal axis of the pylon and along the vertical axis of the pylon, and
    wherein the central front tie is configured to only take forces exerted in the transverse axis of the pylon.

6. An engine assembly comprising:
    a turbine engine;
    a wing; and
    the attachment pylon according to claim 1,
    wherein the attachment pylon supports the turbine engine, and the wing supports the attachment pylon.

7. An aircraft comprising at least one engine assembly according to claim 6.

* * * * *